(12) United States Patent  (10) Patent No.: US 7,021,292 B2
Yamaguchi et al.  (45) Date of Patent: Apr. 4, 2006

(54) PRESSURE SENSOR DEVICE OF INTERNAL COMBUSTION ENGINE

(75) Inventors: Shingo Yamaguchi, Tokyo (JP); Koji Nishimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/898,937

(22) Filed: Jul. 27, 2004

(65) Prior Publication Data

US 2005/0051140 A1  Mar. 10, 2005

(30) Foreign Application Priority Data

Sep. 10, 2003 (JP) ............................ P2003-318512

(51) Int. Cl.
*F02D 41/22* (2006.01)
(52) U.S. Cl. ...................... 123/479; 123/688; 123/690; 123/684
(58) Field of Classification Search ................ 123/479, 123/688, 690, 684, 339.1–339.29
See application file for complete search history.

(56) References Cited

U.S. PATENT DOCUMENTS 5,384,707 A * 1/1995 Kerns et al. ................. 701/114
5,404,843 A * 4/1995 Kato ......................... 123/73 B
5,505,179 A * 4/1996 Brennan ...................... 123/479
6,250,292 B1* 6/2001 Suhre ......................... 123/688

FOREIGN PATENT DOCUMENTS

| JP | 07-293303 A | 11/1995 |
| JP | 11-082132 A | 3/1999 |
| JP | 2001-132521 A | 5/2001 |

* cited by examiner

*Primary Examiner*—Erick Solis
(74) *Attorney, Agent, or Firm*—Sughrue Mion, PLLC

(57) ABSTRACT

A pressure sensor device of an internal combustion engine includes: a pressure sensor detecting a pressure in an intake pipe of an internal combustion engine, a pressure sensor failure determination device determining a failure of the pressure sensor, an idle determination device detecting that an opening of a throttle adjusting an air quantity supplied to the internal combustion engine is in an idle position, and a pressure sensor output value control device limiting an output value from the pressure sensor for use in a fuel injection quantity control of the internal combustion engine to be not more than a predetermined value when the throttle opening is determined by the idle determination device to be in the idle position and when the pressure sensor is not determined as being in failure by the pressure sensor failure determination device. This pressure sensor device prevents the over-rich of fuel injection quantity.

4 Claims, 7 Drawing Sheets

PRESSURE SENSOR DEVICE OF INTERNAL COMBUSTION ENGINE

BACKGROUND OF THE INVENTION

1. Field of the Invention

The present invention relates to a pressure sensor device for use in an internal combustion engine and, more particularly, to a pressure sensor device of an internal combustion engine for controlling an output value from a pressure sensor during a time period from occurrence of any erroneous output value in a pressure sensor to decision of failure of the pressure sensor, thereby desirably controlling a fuel injection quantity of an internal combustion engine.

2. Description of the Related Art

In an internal combustion engine, according to a fuel injection system of speed density type, a basic fuel injection quantity to be supplied to the internal combustion engine is determined based on outputs from a pressure sensor that detects a pressure in an intake pipe and from an engine speed sensor that detects an engine speed of the internal combustion engine. A basic fuel injection quantity is generally set so that a fuel injection quantity becomes larger as a pressure in the intake pipe comes to be higher.

FIG. 7 is a schematic diagram of a general control device of an internal combustion engine of speed density type. In this drawing, reference numeral 1 designates an internal combustion engine. Numeral 2 designates an intake pipe for inducing air to be sucked into the internal combustion engine 1. Numeral 3 designates an air cleaner for purifying air to be sucked into the internal combustion engine 1. Numeral 4 designates a throttle for adjusting an air quantity to be sucked into the internal combustion engine 1 in association with an accelerator. Numeral 5 designates a throttle opening sensor for detecting an opening θ of the throttle 4. Numeral 6 designates an engine speed sensor for detecting an engine speed Ne of the internal combustion engine 1. Numeral 7 designates a pressure sensor for detecting a pressure in the intake pipe.

Numeral 8 designates an electronic control unit (ECU) including a microcomputer. In the electronic control unit (ECU) 8, outputs from the throttle opening sensor 5, the engine speed sensor 6, the pressure sensor 7 and the like are inputted to the ECU and transmitted through the circuit on the ECU. Further, an analog data is converted to a digital data with an A/D converter. Furthermore, on the basis of those data values, a fuel injection quantity to be supplied to the internal combustion engine, an ignition time, an air quantity at an idle time and the like are arithmetically operated. Numeral 9 designates an injector for injecting a fuel downstream of the intake pipe 2 based on a fuel injection quantity having been operated in the ECU 8.

The pressure sensor 7 includes a plus electrode terminal to which, for example, a voltage of 5V is applied, and a ground terminal to which a voltage of 0V is applied. The pressure sensor 7 detects a pressure in the intake pipe 2, and outputs from an output terminal a voltage of 4V at the time of atmospheric pressure and a voltage of 0V at the time of vacuum pressure. This output from the pressure sensor 7 is inputted to the microcomputer on the ECU as an output value Pout from the pressure sensor via the electric circuit on the ECU.

The output from the pressure sensor 7 is used for arithmetic operation of a fuel injection quantity and the like, and plays a major role for supplying a fuel essential for the internal combustion engine, and therefore an operation state of the pressure sensor 7 is monitored at all times. Determination of whether or not the pressure sensor 7 is in failure is made based on whether or not the output value Pout from the pressure sensor 7 is a value that cannot be taken normally. For example, an upper limit Phigh and a lower limit Plow that an output Pout from the pressure sensor can take under normal conditions are preliminarily set, and the output value Pout from the pressure sensor 7 is compared with these upper and lower limits.

When Pout>Phigh, the failure on the upper limit side of the pressure sensor 7 is determined.

When Pout<Plow, the failure on the lower limit side of the pressure sensor 7 is determined.

For example, according to the Japanese Patent Publication (unexamined) No.293303/1997, in a device for compensating a fuel injection quantity based on the variation of an output Pout from the pressure sensor, the following operations are performed. That is, in case of the pressure sensor being determined as being in failure, an output from the pressure sensor for use in the fuel operation is forced to replace with a dummy value having been preliminarily set. At this time, to prevent compensation of a fuel injection quantity due to change in output from the pressure sensor, any compensation of a fuel injection quantity due to change in output from the pressure sensor is inhibited after the pressure sensor has been determined as being in failure. As an alternative means, an output from the pressure sensor for use in the fuel operation is caused to change by degrees up to a dummy value after the pressure sensor has been determined as being in failure thereby preventing the compensation of a fuel injection quantity due to sharp change in output from the pressure sensor.

However, in the conventional pressure sensor error time control device of an internal combustion engine, the following operations have been executed. For example, in the case where an output from the pressure sensor is inputted to a microcomputer after having been processed with a filter on an input circuit of an ECU, there is a time lag between the occurrence of an erroneous value of the pressure sensor and the determination of failure even if the compensation of a fuel injection quantity is inhibited after any failure has been determined. Further, the basic operation of a fuel injection quantity is executed on the basis of an output Pout from the pressure sensor and an engine speed of the internal combustion engine. As a result, until the determination of failure, the fuel operation is undesirably performed based on an erroneous output value Pout from the pressure sensor, the output value Pout being different from an actual pressure in the intake pipe.

For example, in the case where the pressure sensor shows such a behavior as upper limit-side failure when a throttle opening is in the idle position, as shown in FIG. 2, an output value Pout from the pressure sensor becomes larger gradually due to filter processing in an input circuit of the ECU even if any error occurs in the pressure sensor. Therefore, there arises a time lag between the occurrence of the erroneous output value from the pressure sensor and the determination of failure, and accordingly during a time period until the failure is determined, the fuel operation is performed with an output Pout from the pressure sensor, the value Pout being larger than an actual pressure in the intake pipe. Consequently, a problem exits in that, as shown in the lower chart of FIG. 2, a fuel exceeding an essentially required fuel injection quantity is supplied to the internal combustion engine eventually resulting in a state of over-rich.

SUMMARY OF THE INVENTION

The present invention was made to solve the above-discussed problem and has an object of controlling a value of a pressure sensor for use in arithmetic operation of a fuel injection quantity during a time period from the indication of an erroneous output value of the pressure sensor to the determination of failure of the pressure sensor to prevent the over-rich or over-lean of the fuel injection quantity.

A pressure sensor device of an internal combustion engine according to the invention includes:

a pressure sensor for detecting a pressure in an intake pipe of an internal combustion engine; pressure sensor failure determination means for determining a failure of this pressure sensor; idle determination means for detecting that an opening of a throttle adjusting an air quantity to be supplied to the internal combustion engine is in an idle position; and pressure sensor output value control means for limiting an output value from the mentioned pressure sensor for use in a fuel injection quantity control of the internal combustion engine to be not more than a predetermined value when the mentioned throttle opening is determined by the mentioned idle determination means to be in the idle position and when the mentioned pressure sensor is not determined as being in failure by the mentioned pressure sensor failure determination means.

According to the above pressure sensor device of an internal combustion engine of the invention, an output value from the pressure sensor for use in the operation of a fuel injection quantity is limited to be not more than a predetermined value when a throttle opening is in the idle position and the pressure sensor is not determined as being in failure. Therefore, a value of the pressure sensor for use in the operation of a fuel injection quantity comes to be a limited value during a time period from the indication of an erroneous output value of the pressure sensor to the determination of failure of the pressure sensor. As a result, it is possible to prevent the over-rich due to the fact that a fuel injection quantity becomes too much.

Another pressure sensor device of an internal combustion engine includes:

a pressure sensor for detecting a pressure in an intake pipe of an internal combustion engine; pressure sensor failure determination means for determining a failure of this pressure sensor; idle determination means for detecting that an opening of a throttle adjusting an air quantity to be supplied to the internal combustion engine is at not less than a predetermined opening; and pressure sensor output value control means for controlling an output value from the mentioned pressure sensor for use in a fuel injection quantity control of the internal combustion engine to be not less than a predetermined value when the mentioned throttle opening is determined by the mentioned idle determination means to be not less than a predetermined opening and when the mentioned pressure sensor is not determined as being in failure by the mentioned pressure sensor failure determination means.

According to the above pressure sensor device of an internal combustion engine of the invention, an output value from the pressure sensor for use in the operation of a fuel injection quantity is controlled to be not less than a predetermined value when a throttle opening is not less than a predetermined opening and when the pressure sensor is not determined as being in failure. Therefore, a value of the pressure sensor for use in the operation of a fuel injection quantity comes to be a controlled value during a time period from the indication of an erroneous output value of the pressure sensor to the determination of failure of the pressure sensor. As a result, it is possible to prevent the over-lean due to the fact that a fuel injection quantity becomes too little.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
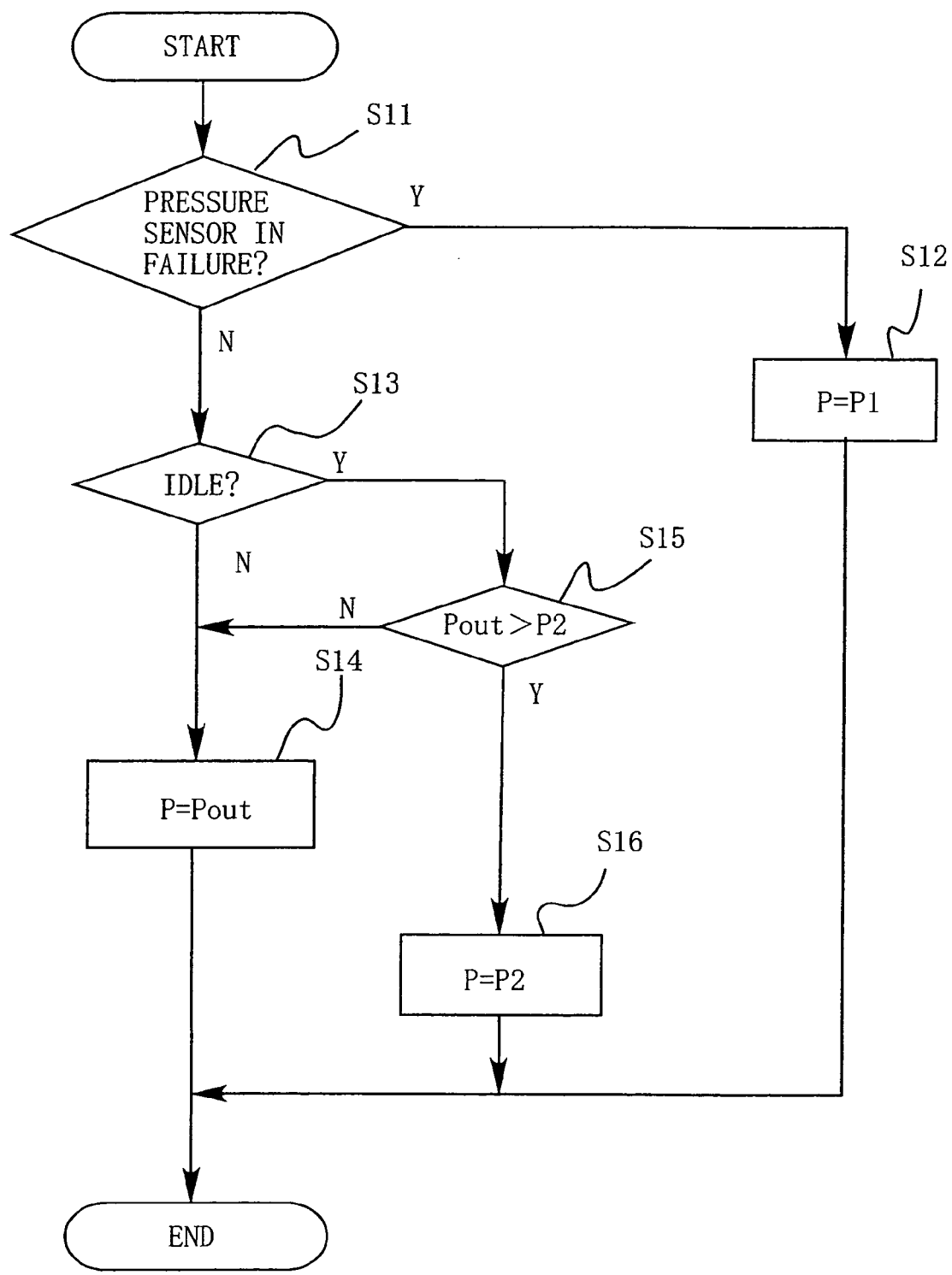
FIG. 1 is a flowchart explaining operation of a pressure sensor device of an internal combustion engine according to a first preferred embodiment of the present invention.
Figure 7:
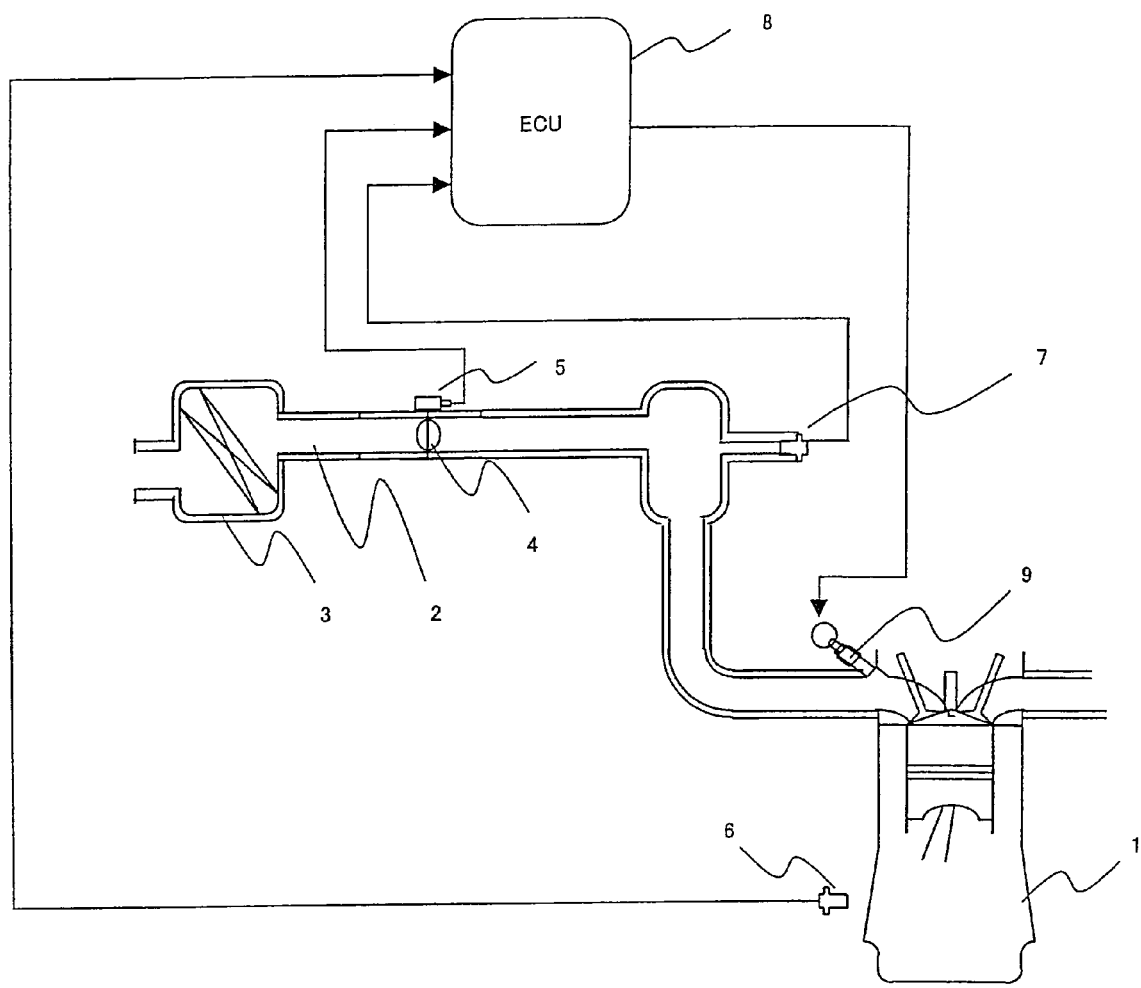
FIG. 7 is a schematic diagram showing a general control device of an internal combustion engine.

FIG. 1 is a flowchart showing operations of a pressure sensor device of an internal combustion engine according to a first preferred embodiment of the present invention, and these processing operations are executed in an ECU 8 every predetermined time period or every predetermined crank angle. In addition, the whole constitution of a general internal combustion engine to which preferred embodiments according to the invention (inclusive of embodiments as later described) are applied, is as shown in FIG. 7. This pressure sensor is different from a pressure sensor according to the conventional art in the aspect of controlling an output value. Further, the ECU 8 is provided with means for storing an output value P from a pressure sensor for use in the operation of a fuel injection quantity in addition to an output value Pout from the pressure sensor. Besides, in the ECU 8, an output Pout from the pressure sensor that is not limited is used for the determination of failure of the pressure sensor, thereby monitoring at all times whether or not the pressure sensor is in failure.

In this example, the ECU 8 includes a pressure sensor failure determination means for determining whether or not the pressure sensor 7 is in failure; an idle determination means for detecting whether or not an opening θ of the throttle 4 is in the idle position; means for determining whether or not an output value Pout from the pressure sensor 7 is larger than a predetermined value P2; means for establishing an output value P from the pressure sensor 7 for use in the operation of a fuel injection quantity as a predetermined value P1; means for establishing an output value P from the pressure sensor 7 for use in the operation of a fuel injection quantity as an output Pout from the pressure sensor; and means for establishing an output value P from the pressure sensor for use in the operation of a fuel injection quantity as a predetermined value P2.

Now, operations of the first embodiment shown in FIG. 1 are described with reference to FIG. 7. First, the ECU 8 reads an output value Pout from the pressure sensor 7 showing a pressure in the intake pipe 2 and an output value θ from the throttle opening sensor 5 showing a throttle opening of the throttle 4.

Subsequently, the ECU 8 determines whether or not the pressure sensor 7 is in failure on the basis of the output value Pout from the pressure sensor 7 and the like (Step S11). As a method for determining the failure, for example, an upper limit Phigh and a lower limit Plow that an output Pout from the pressure sensor can take under normal conditions, have been preliminarily set in the ECU 8, and an output value Pout from the pressure sensor are compared with these set upper and lower limits.

Supposing that Pout>Phigh or Pout<Plow, the failure of the pressure sensor 7 is determined.

Even in the case where the pressure sensor is determined as being in failure, a dummy value P1 of an output value from the pressure sensor is preliminarily set in the ECU 8 in order to prevent a large effect on the control of the fuel injection quantity of the internal combustion engine. Since a pressure in the intake pipe varies depending on a throttle opening θ, a value of the dummy value P1 is set to be a value varying in accordance with the throttle opening θ or a value approximately fixed. In the case where the pressure sensor is determined as being in failure in Step S11, the output value P from the pressure sensor for use in the operation of the fuel injection quantity is set to be P1 (Step S12), and the processing comes to end.

In the case where the pressure sensor 7 is determined to be normal in Step S11, it is determined whether or not the throttle opening θ is in the idle state (Step S13). In the case where the throttle opening θ is determined not to be in the idle state, an output value Pout of the pressure sensor is established as it is as an output value P from the pressure sensor for use in the operation of a fuel injection quantity (Step S14), that is, P=Pout, and the processing comes to end.

In the case where the throttle opening θ is determined to be in the idle position in Step S13, it is determined whether or not an output value Pout from the pressure sensor is larger than a predetermined value P2 (Step S15). When the output value Pout from the pressure sensor is larger than a predetermined value P2, an output value P from the pressure sensor 7 is established as P2 (Step S16), that is, P=P2. In this case, a predetermined value P2 is to be preliminarily set to a value larger than the maximum value that an output from the pressure sensor can take at the idle time.

Figure 2:
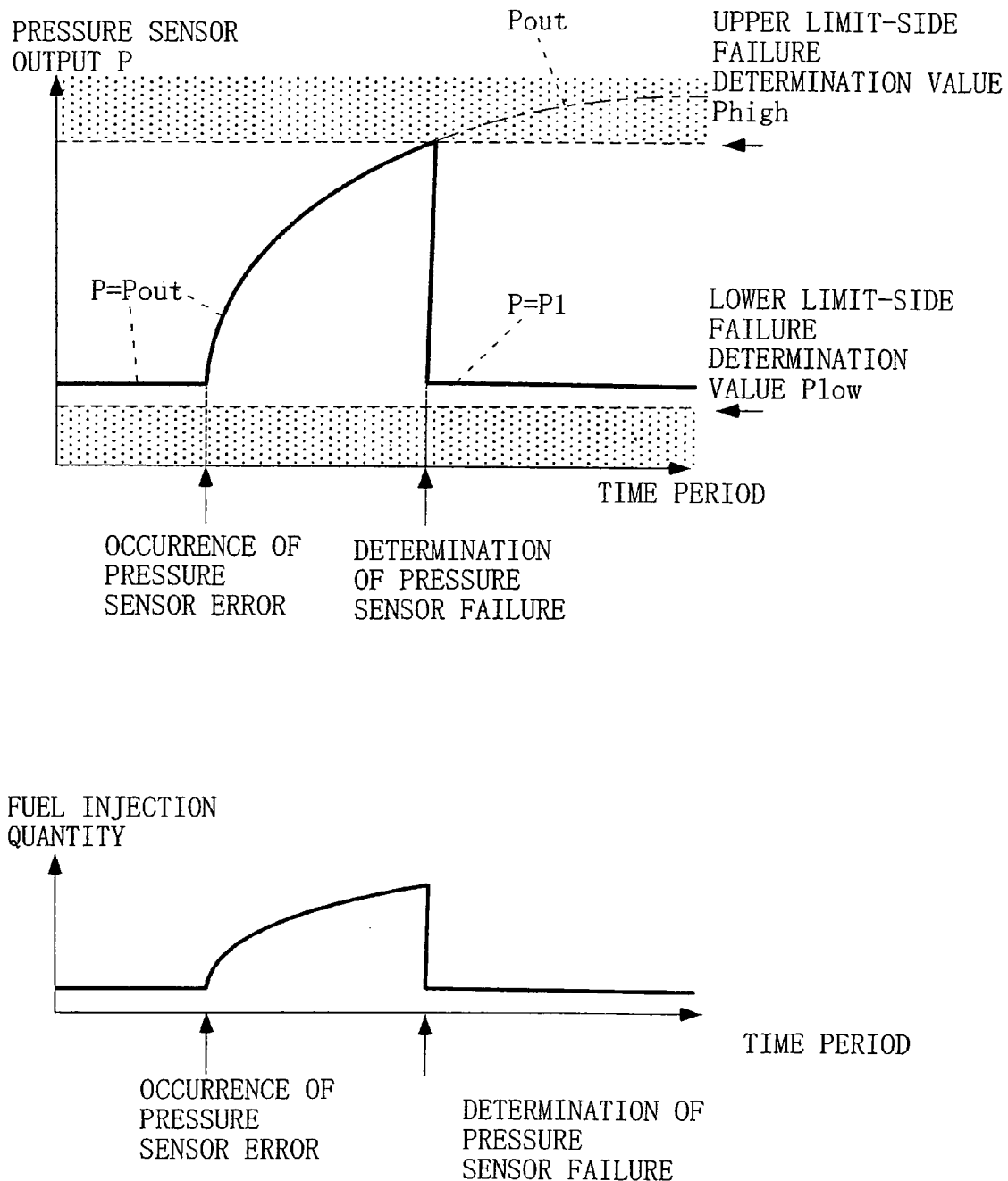
FIG. 2 is a timing chart showing an output value of a pressure sensor and a fuel injection quantity based on this output value at the time of failure of the pressure sensor according to a prior art.
Figure 3:
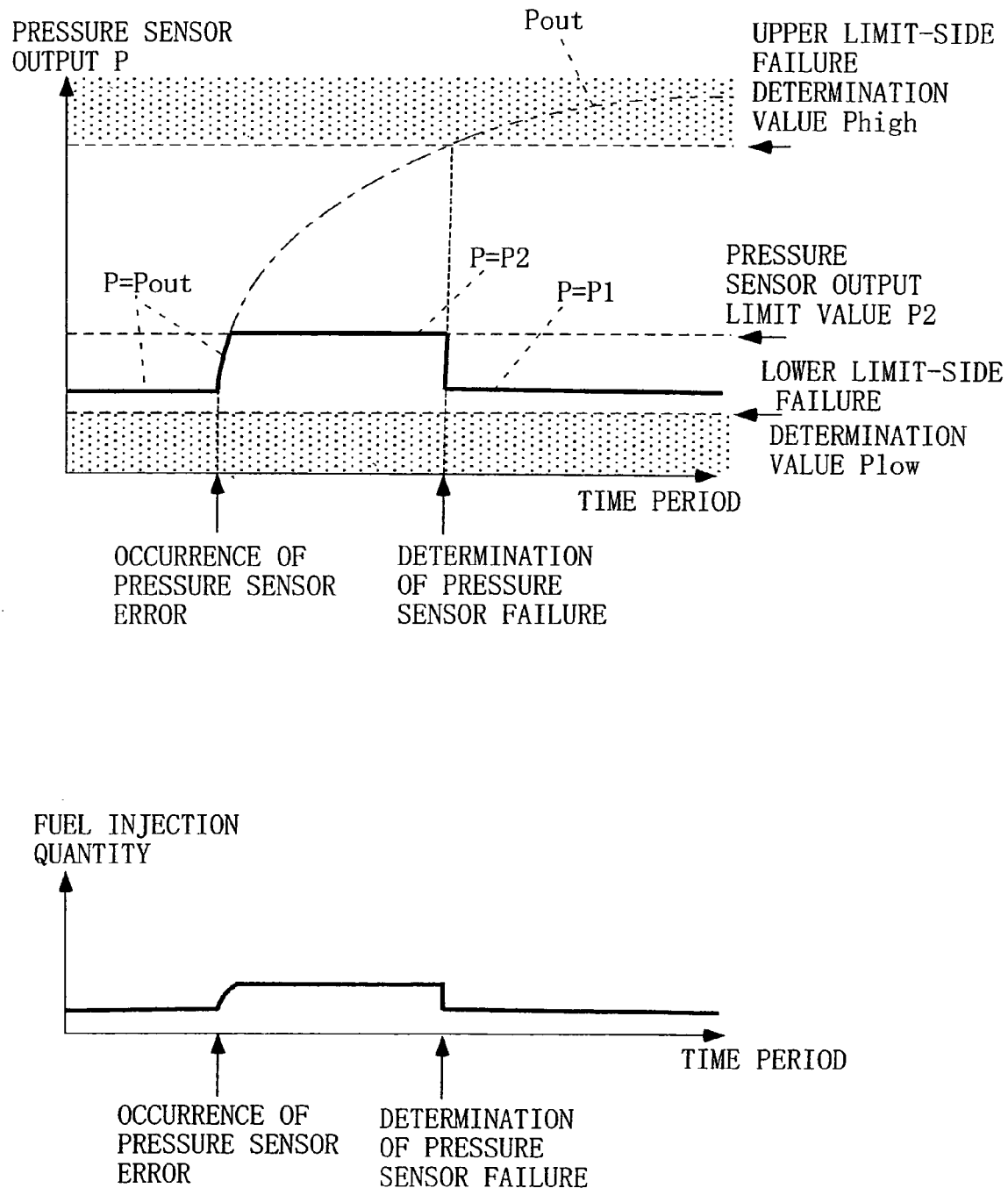
FIG. 3 is a timing chart showing an output value of the pressure sensor and a fuel injection quantity at the time of failure of the pressure sensor according to the first embodiment.

This processing prevents an over-rich in the following manner. That is, in the case where any upper limit-side failure of the pressure sensor occurs at the idle time, as shown in FIG. 2, the output value P from the pressure sensor for use in the operation of a fuel injection quantity remains Pout until the pressure sensor is determined as being in failure, and the operation of a fuel injection quantity is executed with P=Pout as described above, whereby too much fuel will be supplied as shown in the lower-side chart of FIG. 2. This over-rich is effectively prevented such that, as shown in FIG. 3, the output P from the pressure sensor for use in the operation of a fuel injection quantity is limited to P2 immediately after the failure has occurred in the pressure sensor. Although the fuel injection quantity may be increased a little, suppression of a fuel injection quantity is conducted more effectively than in the case of FIG. 2 to which the pressure sensor according to the invention is not applied, eventually enabling to prevent the over-rich.

In this manner, when any throttle opening is determined to be in the idle position by idle determination means and the pressure sensor is not determined as being in failure by pressure sensor failure determination means, an output from the pressure sensor for use in the control of a fuel injection quantity of an internal combustion engine is limited to be not more than a predetermined value.

In the case where any output Pout from the pressure sensor 7 is not more than a predetermined value P2 in Step S15, the output value Pout from the pressure sensor is used as it is for an output value P from the pressure sensor for use in the operation of a fuel injection quantity, that is, P=Pout (Step S14), and the processing comes to end.

Embodiment 2

According to the foregoing first embodiment, in the case where the throttle opening θ is in the idle position and when the pressure sensor is not determined as being in failure, the output value Pout from the pressure sensor 7 is compared with the predetermined value P2 larger than the maximum value that the pressure sensor can take at the idle time in Step S15. However, since a pressure in the intake pipe varies responsive to an engine speed of the internal combustion engine even in the case where the throttle opening θ is in the idle position, it is preferable that P2 is set to a value varying in accordance with the engine speed of the internal combustion engine.

Furthermore, the predetermined value, to which the output value from the pressure sensor is limited by the pressure sensor output value control means, may be set to value not less than an output value that the pressure sensor at the normal time can take in accordance with the engine speed of the internal combustion engine when a throttle opening is in the idle position. In this manner, an output from the pressure sensor is optimally limited responsive to the variation of a pressure in the intake pipe in accordance with an engine speed of the internal combustion engine. Further, the output value P from the pressure sensor for use in the operation of a fuel injection quantity is limited even if the pressure sensor outputs a value larger than actual pressure in the intake pipe. As a result, it is possible to prevent the over-rich due to the fact that a fuel injection quantity comes to be too much.

Embodiment 3

Figure 4:
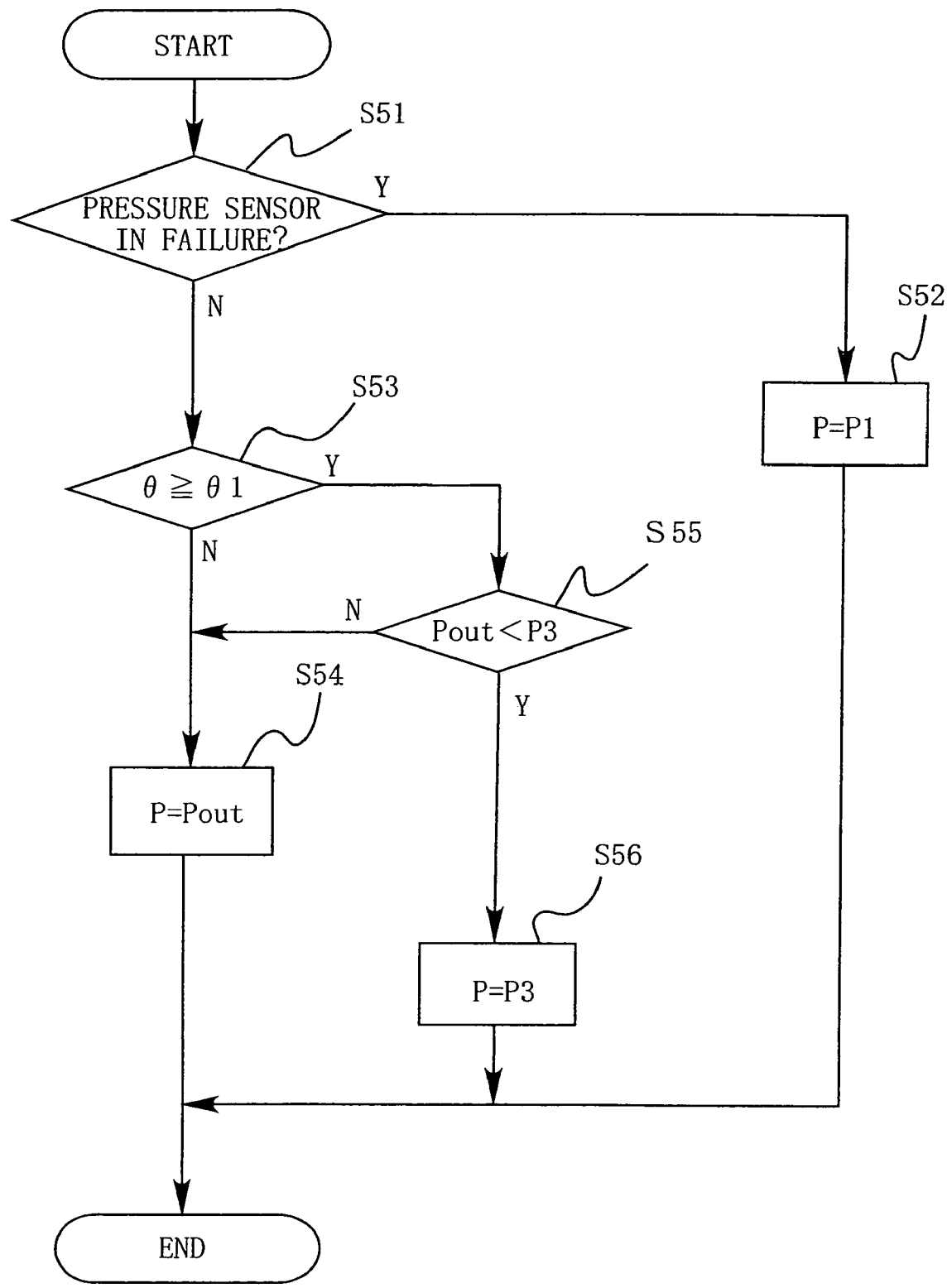
FIG. 4 is a flowchart explaining operation of a pressure sensor device of an internal combustion engine according to a third embodiment.

FIG. 4 is a flowchart showing operations of a pressure sensor device of an internal combustion engine according to a third preferred embodiment. These processing operations are executed in the ECU 8 every predetermined time period or every predetermined crank angle. Furthermore, the ECU 8 is provided with means for storing the output value P from a pressure sensor for use in the fuel operation in addition to the output value Pout from the pressure sensor.

In this example, the ECU 8 includes a pressure sensor failure determination means for determining whether or not the pressure sensor 7 is in failure; a throttle opening determination means for determining whether or not an opening θ of the throttle 4 is not less than a predetermined opening θ; means for determining whether or not an output value Pout from the pressure sensor 7 is smaller than a predetermined value P3; means for establishing an output value P from the pressure sensor 7 for use in the operation of a fuel injection quantity as a predetermined value P1; means for establishing an output value P from the pressure sensor 7 for use in the operation of a fuel injection quantity as an output Pout from the pressure sensor; and means for establishing an output value P from the pressure sensor for use in the operation of a fuel injection quantity as a predetermined value P3.

Now, operations of the third embodiment shown in FIG. 4 are described. First, the ECU 8 reads an output value Pout from the pressure sensor 7 showing a pressure in the intake pipe 2 and an output value θ from the throttle opening sensor 5 showing a throttle opening of the throttle 4.

Subsequently, the ECU 8 determines whether or not the pressure sensor 7 is in failure based on the output value Pout from the pressure sensor 7 and the like (Step S51) A method for determining the failure is, e.g., the method used in Step S11 according to the foregoing first embodiment.

In the case where the pressure sensor 7 is determined as being in failure in Step S51, an output value P from the pressure sensor for use in the operation of a fuel injection quantity is established to be P1 (Step S52), and the processing comes to end. In this step, P1 is preliminarily set in the same manner as in Step S12 of the foregoing first embodiment.

In the case where the pressure sensor 7 is determined to be normal in Step S51, it is determined whether or not a throttle opening θ is not less than a predetermined opening θ1 (Step S53). In this step, a predetermined opening θ1 is set to a throttle opening θ when a throttle is half-open, full-open or the like. In the case where a throttle opening θ is determined to be less than the predetermined opening θ1, an output value Pout from the pressure sensor is used as it is for an output value P from the pressure sensor for use in the operation of a fuel injection quantity, that is, P=Pout (Step S54), and the processing comes to end.

In the case where a throttle opening θ is determined to be not less than a predetermined opening θ1 in Step S53, it is determined whether or not an output value Pout from the pressure sensor is smaller than a predetermined value P3 (Step S55). When the output value Pout from the pressure sensor is smaller than a predetermined value P3, an output value P from the pressure sensor 7 is established as P3 (Step S56). In this step, the predetermined value P3 is preliminarily set to a value smaller than the minimum value that the pressure sensor can take when the throttle opening θ is not less than the predetermined opening θ1.

Figure 5:
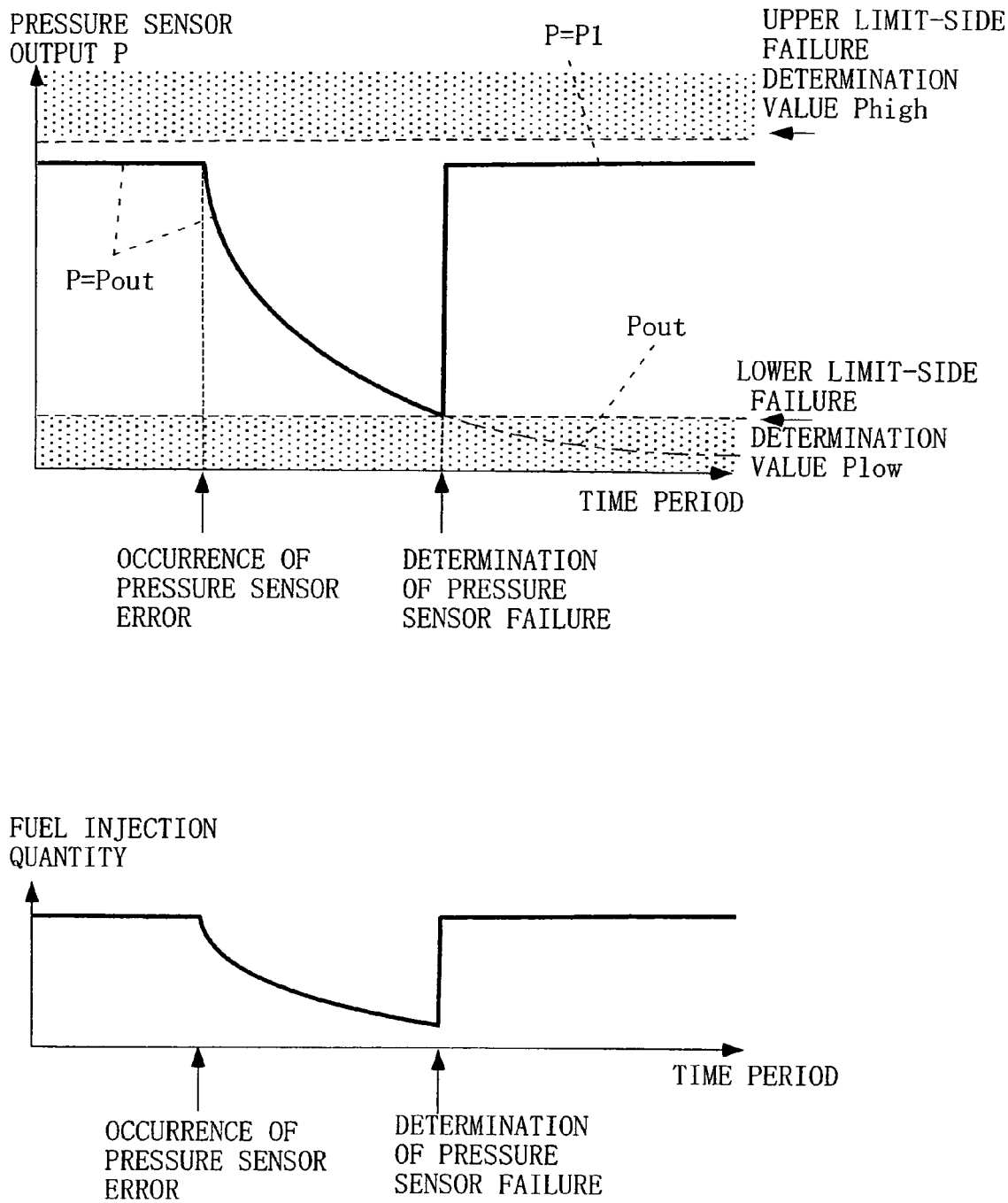
FIG. 5 is a timing chart showing an output value of the pressure sensor and a fuel injection quantity based on this output value at the time of failure of the pressure sensor according to the prior art.
Figure 6:
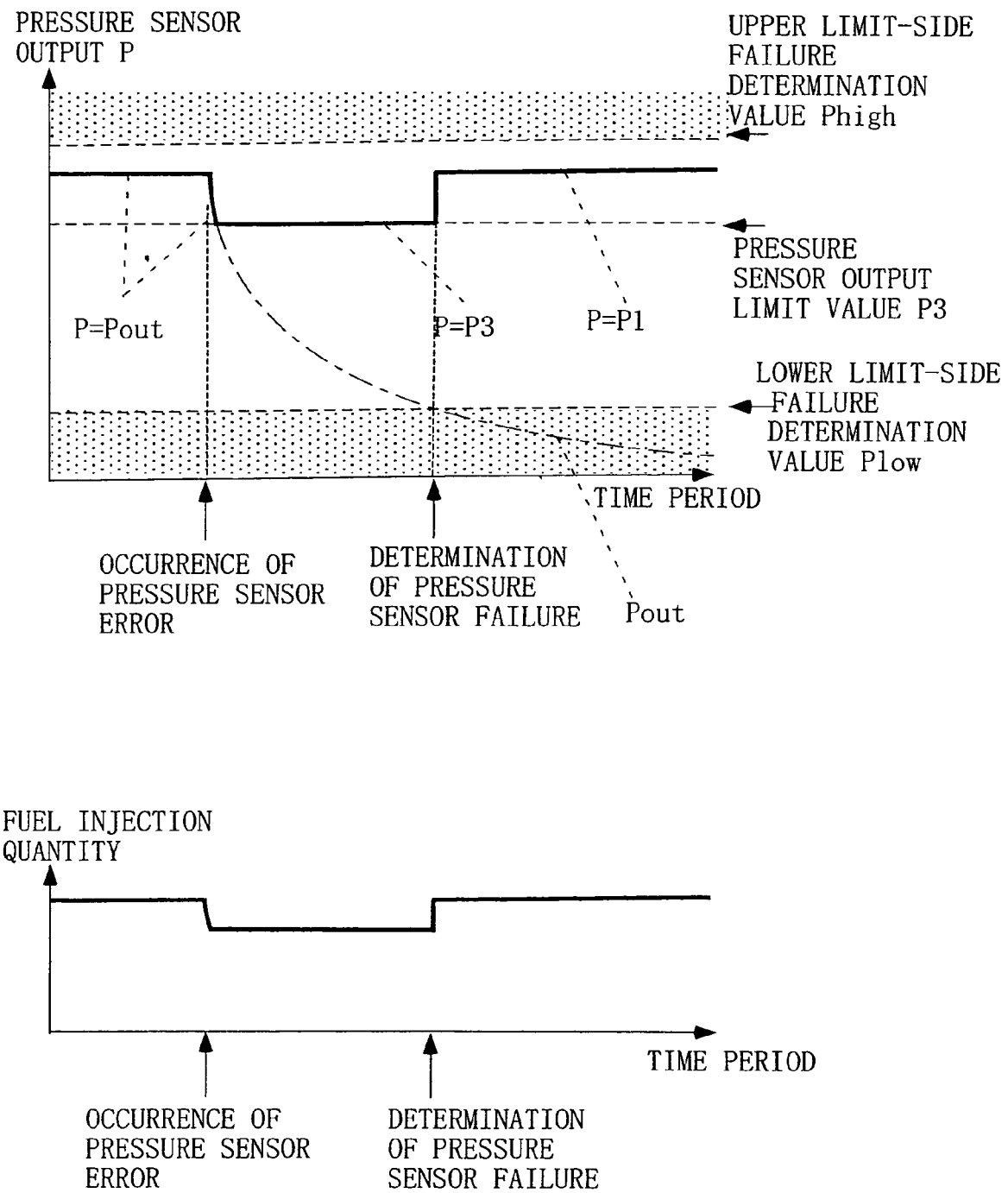
FIG. 6 is a timing chart showing an output value from the pressure sensor and a fuel injection quantity at the time of failure of the pressure sensor according to the third embodiment.

This processing prevents an over-lean in the following manner. That is, in the case where an lower limit-side failure of the pressure sensor occurs and when the throttle opening θ is not less than a predetermined opening θ1, as shown in FIG. 5, an output value P from the pressure sensor for use in the operation of a fuel injection quantity remains Pout until the pressure sensor is determined as being in failure, and the operation of a fuel injection quantity is executed with P=Pout as described above, whereby fuel to be supplied becomes too little as shown in the lower-side chart of FIG. 5. This over-rich is effectively prevented such that, as shown in FIG. 6, the output P from the pressure sensor for use in the operation of a fuel injection quantity is controlled at P3 immediately after the error has occurred in the pressure sensor. Although the fuel injection quantity may be increased a little, suppression of a fuel injection quantity is conducted more effectively than in the case of FIG. 5 to which the pressure sensor according to this third embodiment is not applied, thereby enabling to prevent the overlean.

In this manner, when a throttle is determined to be not less than a predetermined opening by throttle opening determination means and the mentioned pressure sensor is not determined as being in failure by pressure sensor failure determination means, an output from the pressure sensor for use in the control of a fuel injection quantity of an internal combustion engine is controlled (or limited) to be not less than a predetermined value.

In the case where an output Pout from the pressure sensor 7 is not less than a predetermined value P3 in Step S55, an output value Pout from the pressure sensor is used as it is for an output value P from the pressure sensor for use in the operation of a fuel injection quantity, that is, P=Pout (Step S54), and the processing comes to end.

Embodiment 4

According to the foregoing third embodiment, in the case where a throttle opening θ is not less than a predetermined opening θ1 and when the pressure sensor is not determined as being in failure, the output value Pout from the pressure sensor 7 is compared with the predetermined value P3 larger than the maximum value that the pressure sensor can take at the time of a throttle opening θ being not less than a predetermined opening θ1 in Step S55. However, since a pressure in the intake pipe is changed responsive to an engine speed of the internal combustion engine even in the case where the throttle opening θ is not less than the predetermined opening θ1, it is preferable that P3 is set to a value varying in accordance with the engine speed of the internal combustion engine.

Furthermore, the predetermined value at which the pressure sensor output value control means controls the output value from the pressure sensor is set to a value not more than an output value that the pressure sensor at the normal time can take in accordance with the engine speed of the internal combustion engine when a throttle is at not less than a predetermined opening. In this manner, an output from the pressure sensor is optimally controlled responsive to the variation of a pressure in the intake pipe in accordance with an engine speed of the internal combustion engine. Further, the output value P from the pressure sensor for use in the operation of a fuel injection quantity is controlled even if the pressure sensor outputs a value smaller than actual pressure in the intake pipe. As a result, it is possible to prevent the over-lean due to the fact that a fuel injection quantity comes to be too little.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A pressure sensor device of an internal combustion engine comprising:

a pressure sensor for detecting a pressure in an intake pipe of an internal combustion engine; pressure sensor failure determination means for determining a failure of said pressure sensor; idle determination means for detecting that an opening of a throttle adjusting an air quantity to be supplied to the internal combustion engine is in an idle position; and pressure sensor output value control means for limiting an output value from said pressure sensor for use in a fuel injection quantity control of the internal combustion engine to be not more than a predetermined value when said throttle opening is determined by said idle determination means to be in the idle position and when said pressure sensor is not determined as being in failure by said pressure sensor failure determination means.

2. The pressure sensor device of an internal combustion engine according to claim 1, wherein a predetermined value to which said pressure sensor output value control means limits said output value from said pressure sensor, is set to a value not less than an output value that said pressure sensor can take at the normal time in accordance with an engine speed of the internal combustion engine when said throttle opening is in the idle position.

3. A pressure sensor device of an internal combustion engine comprising:
a pressure sensor for detecting a pressure in an intake pipe of an internal combustion engine; pressure sensor failure determination means for determining a failure of said pressure sensor; idle determination means for detecting that an opening of a throttle adjusting an air quantity to be supplied to the internal combustion engine is at not less than a predetermined opening; and
pressure sensor output value control means for controlling an output value from said pressure sensor for use in a fuel injection quantity control of the internal combustion engine to be not less than a predetermined value when said throttle opening is determined by said idle determination means to be not less than a predetermined opening and when said pressure sensor is not determined as being in failure by said pressure sensor failure determination means.

4. The pressure sensor device of an internal combustion engine according to claim 3, wherein a predetermined value at which said pressure sensor output value control means controls an output value from said pressure sensor, is set to a value not more than an output value that said pressure sensor can take at the normal time in accordance with an engine speed of the internal combustion engine when said throttle is at not less than a predetermined opening.

* * * * *